(12) United States Patent
Lee et al.

(10) Patent No.: US 8,425,183 B2
(45) Date of Patent: Apr. 23, 2013

(54) TRIFORIAL TIP CAVITY AIRFOIL

(75) Inventors: Ching-Pang Lee, Cincinnati, OH (US); Kevin Samuel Klasing, Springboro, OH (US); Paul Hadley Vitt, Hamilton, OH (US); Brian David Keith, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1537 days.

(21) Appl. No.: 11/602,421

(22) Filed: Nov. 20, 2006

(65) Prior Publication Data

US 2008/0118363 A1    May 22, 2008

(51) Int. Cl.
*F01D 5/20* (2006.01)
(52) U.S. Cl.
USPC ..................... 415/173.1; 416/97 R
(58) Field of Classification Search .................. 415/115, 415/116, 173.1; 416/90 R, 92, 96 R, 97 R
See application file for complete search history.

(56) References Cited

U.S. PATENT DOCUMENTS

| | | | |
|---|---|---|---|
| 3,635,585 A | 1/1972 | Metzler | |
| 3,781,129 A | 12/1973 | Aspinwall | |
| 4,010,531 A | 3/1977 | Andersen et al. | |
| 4,142,824 A | 3/1979 | Anderson | |
| 4,390,320 A * | 6/1983 | Eiswerth | 416/97 R |
| 4,424,001 A | 1/1984 | North et al. | |
| 4,606,701 A | 8/1986 | McClay et al. | |
| 4,893,987 A | 1/1990 | Lee et al. | |
| 4,940,388 A | 7/1990 | Lilleker et al. | |
| 4,992,025 A | 2/1991 | Stroud et al. | |
| 5,261,789 A | 11/1993 | Butts et al. | |
| 5,282,721 A | 2/1994 | Kildea | |
| 5,476,364 A | 12/1995 | Kildea | |
| 5,503,527 A | 4/1996 | Lee et al. | |
| 5,564,902 A | 10/1996 | Tomita | |
| 5,660,523 A | 8/1997 | Lee | |
| 5,720,431 A | 2/1998 | Sellers et al. | |
| 5,997,251 A * | 12/1999 | Lee | 416/97 R |
| 6,039,531 A | 3/2000 | Suenaga et al. | |
| 6,059,530 A | 5/2000 | Lee | |
| 6,086,328 A | 7/2000 | Lee | |
| 6,164,914 A | 12/2000 | Correia et al. | |

(Continued)

FOREIGN PATENT DOCUMENTS

| | | |
|---|---|---|
| EP | 1059419 | 12/1981 |
| EP | 1221537 | 7/2002 |

(Continued)

OTHER PUBLICATIONS

Mischo, B.,"Flow Physics and Profiling of Recessed Blade Tips: Impact on Performance and Heat Load," ASME GT2006-91074, May 8-11, 2006, pp. 1-11.

(Continued)

*Primary Examiner* — Dwayne J White
(74) *Attorney, Agent, or Firm* — General Electric Company; David J. Clement; Sushupta T. Sudarshan (57) ABSTRACT

A turbine blade includes an airfoil having first and second tip ribs extending along the opposite pressure and suction sides thereof. The tip ribs are spaced apart between the leading and trailing edges of the airfoil to include a trifurcate tip baffle defining a triforial tip cavity.

28 Claims, 4 Drawing Sheets

U.S. PATENT DOCUMENTS

| | | | |
|---|---|---|---|
| 6,224,336 | B1 | 5/2001 | Kercher |
| 6,422,821 | B1 | 7/2002 | Lee et al. |
| 6,527,514 | B2 | 3/2003 | Rueloffs |
| 6,554,575 | B2 | 4/2003 | Leeke et al. |
| 6,595,749 | B2 | 7/2003 | Lee et al. |
| 6,672,829 | B1 | 1/2004 | Cherry et al. |
| 6,790,005 | B2 | 9/2004 | Lee et al. |

FOREIGN PATENT DOCUMENTS

| | | |
|---|---|---|
| GB | 2075129 | 11/1981 |
| GB | 2155558 | 9/1985 |
| JP | 56-162207 | 12/1981 |
| JP | 60-206903 | 10/1985 |
| JP | 11-247612 | 9/1999 |
| JP | 2001098904 | 4/2001 |
| JP | 2002227606 | 8/2002 |

OTHER PUBLICATIONS

U.S. Appl. No. 11/162,433, "Turbine Airfoil with Curved Squealer Tip," filed Sep. 9, 2005, M.E. Stegemiller et al.

U.S. Appl. No. 11/162,434, "Turbine Airfoil Curved Squealer Tip with Tip Shelf," filed Sep. 9, 2005, M.E. Stegemiller et al.

U.S. Appl. No. 11/507,119, filed Aug. 21, 2006, by K.S. Klasing et al.

U.S. Appl. No. 11/507,116, filed Aug. 21, 2006, by K.S. Klasing et al.

U.S. Appl. No. 11/507,120, filed Aug. 21, 2006, by K.S. Klasing et al.

U.S. Appl. No. 11/507,121, filed Aug. 21, 2006, by K.S. Klasing et al.

U.S. Appl. No. 11/507,132, filed Aug. 21, 2006, by C-P. Lee et al.

Japanese Patent Office, Notice of Allowance, May 15, 2012.

UK Intellectual Property Office, Search Report, Mar. 5, 2008.

* cited by examiner

TRIFORIAL TIP CAVITY AIRFOIL

BACKGROUND OF THE INVENTION

The present invention relates generally to gas turbine engines, and, more specifically, to turbine blades therein.

In a gas turbine engine, air is pressurized in a compressor and mixed with fuel for generating combustion gases in a combustor. Various turbine stages extract energy from the combustion gases to power the engine and produce work.

A high pressure turbine (HPT) immediately follows the combustor and extracts energy from the hottest combustion gases to power the upstream compressor through one drive shaft. A low pressure turbine (LPT) follows the HPT and extracts additional energy from the combustion gases for powering another drive shaft. The LPT powers an upstream fan in a turbofan aircraft engine application, or powers an external shaft for marine and industrial applications.

Engine efficiency and specific fuel consumption (SFC) are paramount design objectives in modern gas turbine engines. The various turbine rotor blades and their corresponding nozzle vanes have precisely configured aerodynamic surfaces for controlling the velocity and pressure distributions thereover for maximizing aerodynamic efficiency.

The corresponding airfoils of the blades and vanes have generally concave pressure sides and generally convex suction sides extending axially in chord between opposite leading and trailing edges. The airfoil has a crescent profile in radial section, increasing rapidly in width from the leading edge to a maximum width region, and then decreasing in width gradually to the trailing edge.

The circumferentially or transversely opposite sides of the airfoils also extend radially in span from root to tip. The airfoils typically have thin sidewalls formed by casting of superalloy metals, with internal cooling circuits having various embodiments all specifically tailored for efficiently cooling the airfoils during operation while maximizing efficiency.

However, aerodynamic design of turbine airfoils is remarkably complex in view of the three dimensional 3D configurations of the individual airfoils in complete rows thereof, and the correspondingly complex flow streams of the combustion gases channeled between the airfoils during operation. Adding to this complexity of design and environment are the special flow fields around the radially outer tips of the turbine blades which rotate at high speed inside a surrounding stationary shroud during operation.

The operating clearance or gap between the blade tips and the turbine shrouds should be as small as practical for minimizing leakage of the combustion gas flow therethrough while also permitting thermal expansion and contraction of the blades and shrouds without undesirable rubbing between the rotating tips and stationary shroud.

During operation, the blades in a turbine row drive the supporting rotor disk in rotation with the airfoil suction side leading the opposite airfoil pressure side. The airfoils typically twist from root to tip in the radial direction from the perimeter of the rotor disk, and the leading edges face upstream obliquely with the engine axial centerline axis to match the oblique discharge swirl angle of the cooperating nozzle vanes.

The combustion gases flow generally in the axial downstream direction, with a circumferential or tangential component first engaging the airfoil leading edges in one flow direction, and then leaving the airfoils over the trailing edges thereof in a different flow direction.

The pressure and suction sides of the airfoils have correspondingly different 3D profiles for maximizing differential pressure therebetween and energy extraction from the hot combustion gases. The concave pressure side and the convex suction side effect different velocity and pressure distributions thereover which correspondingly vary between the leading and trailing edges, and from root to tip. However, the combustion gases which leak over the airfoil tips in the required tip clearance perform little, if any, useful work.

Further complicating turbine blade design is the exposed blade tips which are therefore bathed in the combustion gases which leak thereover during operation, and require suitable cooling thereof for ensuring a long useful life of the turbine blades during operation.

Modern turbine blade design typically incorporates squealer tip ribs which are small radial extensions of the pressure and suction sides of the airfoil from leading to trailing edge. The tip ribs are typically rectangular in cross section and spaced transversely or circumferentially apart to define an open tip cavity atop the airfoil which has an integral tip floor that encloses the typically hollow airfoil and the internal cooling circuit therein.

The small tip ribs provide sacrificial material in the event of a tip rub to protect the tip floor and internal cooling circuit from undesirable damage. The tip ribs increase the complexity of the combustion gas flow field introducing local secondary fields which affect turbine efficiency, flow leakage, and tip cooling.

The primary flow direction of the combustion gases is in the axially downstream direction in the flow passages defined between adjacent blades. The axial flow stream also varies along the radial direction from root to tip of each airfoil. And, these axial and radial flow variations are further compounded over the airfoil tip where the combustion gases leak between the pressure and suction sides of each airfoil.

Accordingly, the prior art is replete with various configurations of turbine blade tips addressing different problems and performance considerations including turbine efficiency, tip leakage, and tip cooling. These three important considerations are interdependent at least in part, but the complex 3D flow fields over the different pressure and suction sides at the airfoil tip and between the leading and trailing edges renders quite complex the evaluation thereof.

However, modern computational fluid dynamics (CFD) includes powerful software that improves the ability to mathematically analyze complex 3D flow streams in gas turbine engines and provides a mechanism from which further improvements in turbine blade design may be realized.

For example, it is desired to improve turbine blade tip design by reducing tip flow leakage, or increasing turbine efficiency, or improving tip cooling, or any combination of these factors either separately or together.

BRIEF DESCRIPTION OF THE INVENTION

A turbine blade includes an airfoil having first and second tip ribs extending along the opposite pressure and suction sides thereof. The tip ribs are spaced apart between the leading and trailing edges of the airfoil to include a trifurcate tip baffle defining a triforial tip cavity.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
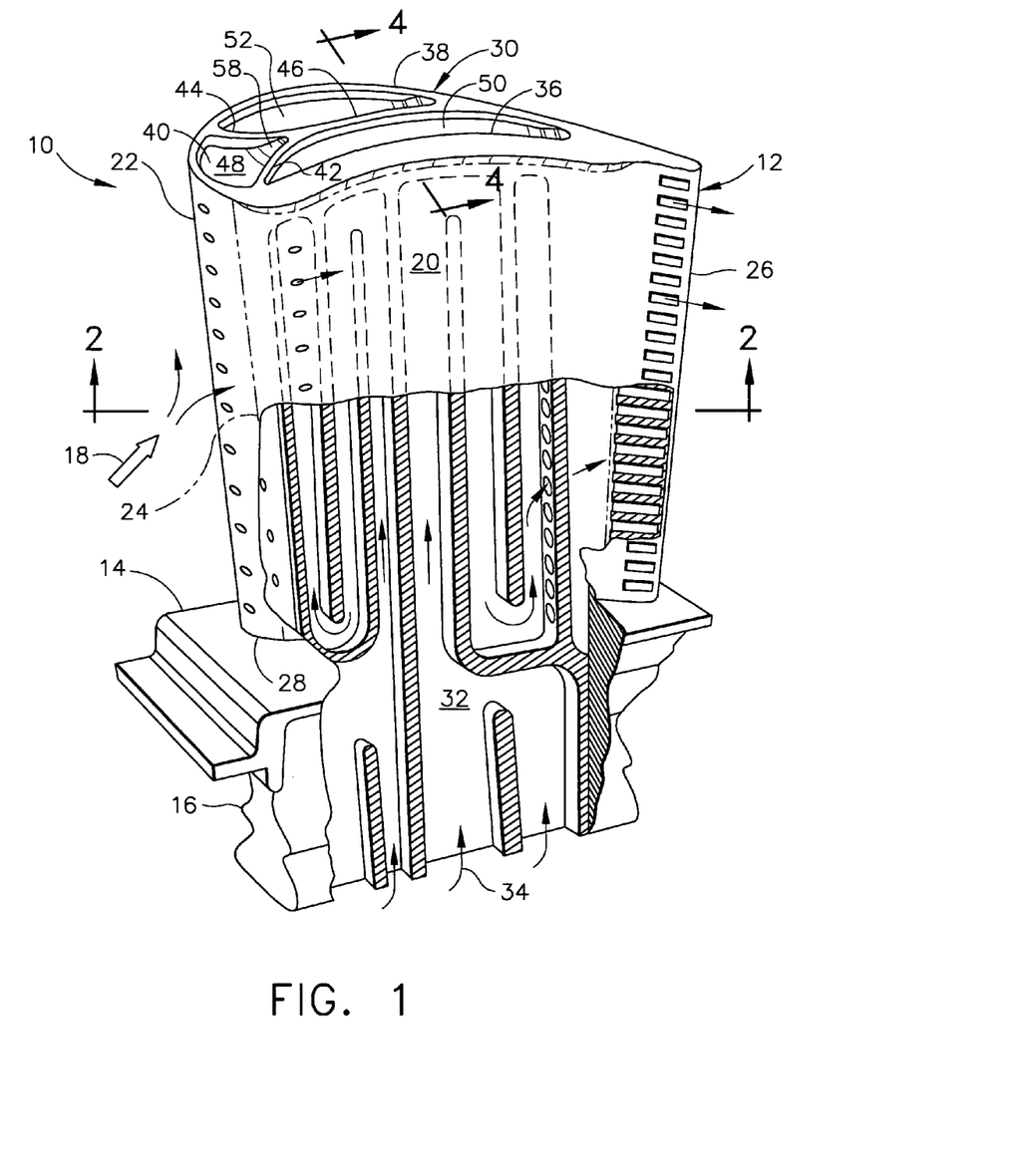
FIG. 1 is a partly sectional isometric view of an exemplary turbine rotor blade.

FIG. 1 illustrates an exemplary first stage turbine rotor blade 10 for use in the HPT of a gas turbine engine. The blade is typically cast from superalloy metal with an airfoil 12, platform 14 at the root thereof, and a supporting dovetail 16 in an integral, one-piece assembly.

The dovetail 16 may have any conventional form, such as the axial-entry dovetail illustrated in FIG. 1, which mounts the blade in a corresponding dovetail slot in the perimeter of a supporting rotor disk (not shown). The disk holds a full row of the blades spaced circumferentially apart from each other to define inter-blade flow passages therebetween.

During operation, combustion gases 18 are generated in the combustor of the engine (not shown) and suitably channeled downstream over the corresponding turbine blades 10 which extract energy therefrom for powering the supporting rotor disk. The individual platform 14 provides a radially inner boundary for the combustion gases and adjoins adjacent platforms in the full row of turbine blades.

Figure 2:
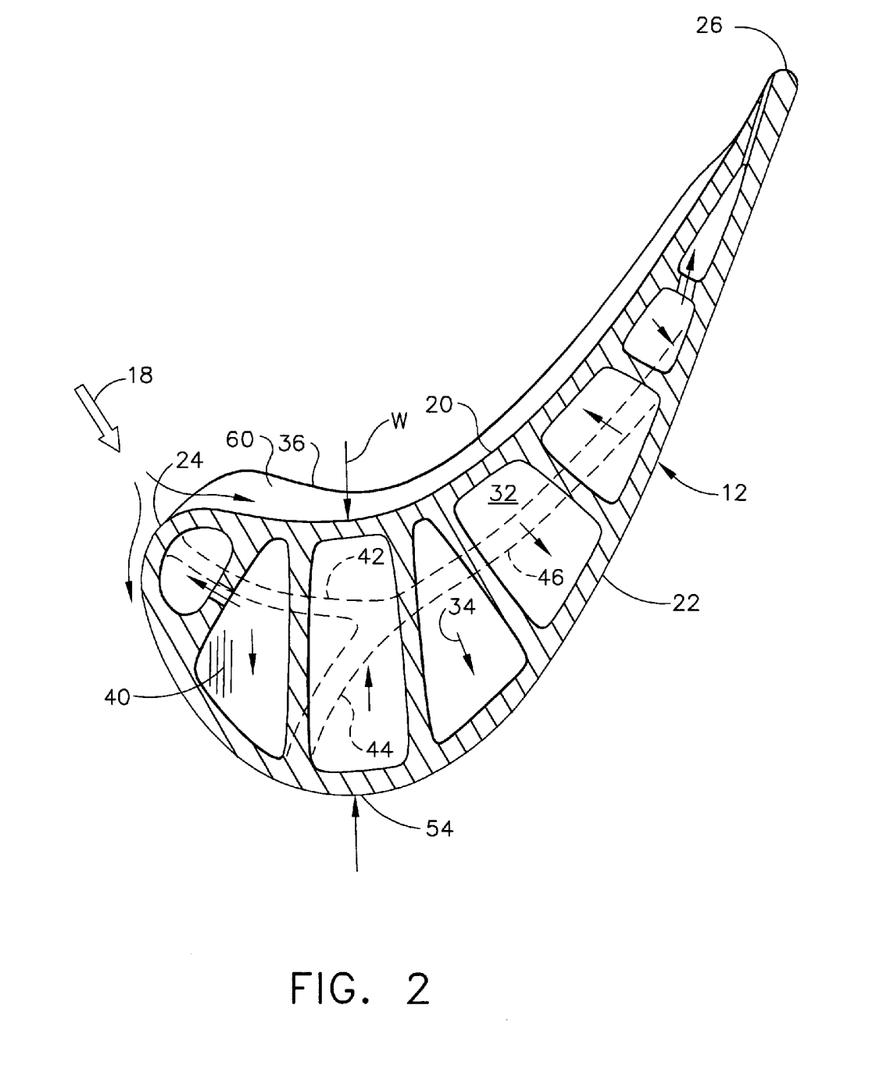
FIG. 2 is a radial sectional view through the airfoil illustrated in FIG. 1 and taken along line 2-2.

The airfoil 12 illustrated in FIGS. 1 and 2 includes circumferentially or transversely opposite pressure and suction sides 20,22 extending axially in chord between opposite leading and trailing edges 24,26, and extends radially in span from the airfoil root 28 to terminate in a radially outer tip cap, or tip, 30. The airfoil pressure side 20 is generally concave between the leading and trailing edges and complements the generally convex airfoil suction side 22 between the leading and trailing edges.

The external surfaces of the pressure and suction sides 20,22 of the airfoil have the typical crescent shape or profile conventionally configured for effecting corresponding velocity and pressure distributions of the combustion gases thereover during operation for maximizing energy extraction from the gases.

The airfoil 12 is typically hollow and includes an internal cooling circuit 32 which may have any conventional configuration, such as the illustrated two three-pass serpentine circuits that terminate in corresponding flow passages behind the leading edge and in front of the trailing edge. The cooling circuit extends through the platform and dovetail with corresponding inlets in the base of the dovetail for receiving pressurized cooling air 34 from the compressor of the engine (not shown) in any conventional manner.

In this way, the blade is internally cooled from root to tip and between the leading and trailing edges by the internal cooling air which then may be discharged through the thin airfoil sidewalls in various rows of film cooling holes of conventional size and configuration.

Since the leading edge of the airfoil is typically subject to the hottest incoming combustion gases, dedicated cooling thereof is provided in any suitable manner. And, the thin trailing edge region of the airfoil typically includes a row of pressure side trailing edge cooling slots for discharging a portion of the spent cooling air.

As described above, the turbine airfoil 12 shown initially in FIG. 1 has a precisely configured 3D external profile which correspondingly affects the velocity and pressure distributions of the combustion gases 18 as they flow in the axial downstream direction from leading to trailing edges 24,26. The blades are attached to the perimeter of the supporting disk and rotate during operation, which generates secondary flow fields in the combustion gases with typically radially outwardly migration of the combustion gases along the span of the airfoil.

Furthermore, the relative pressure of the combustion gases on the pressure side 20 of the airfoil is higher than the pressure along the suction side of the airfoil, and along with the corresponding rotation of the blade during operation introduces further secondary or tertiary affects in the combustion gas flow field as it flows radially up and over the exposed airfoil tip 30 during operation.

The turbine rotor blade described above may be conventional in configuration and operation for use in a gas turbine engine, including for example the first stage of the HPT. The conventional blade may then be modified as described hereinbelow at the airfoil tip 30 to include first and second squealer tip ribs 36,38 which are radially integral extensions of the airfoil pressure and suction sides, or sidewalls, 20,22, respectively, and conform in profile or curvature therewith.

The first or pressure side rib 36 conforms chordally with the shape or profile of the concave pressure side 20 of the airfoil, and correspondingly, the second or suction side rib 38 conforms in chordal profile with the convex suction side 22 of the airfoil.

Figure 3:
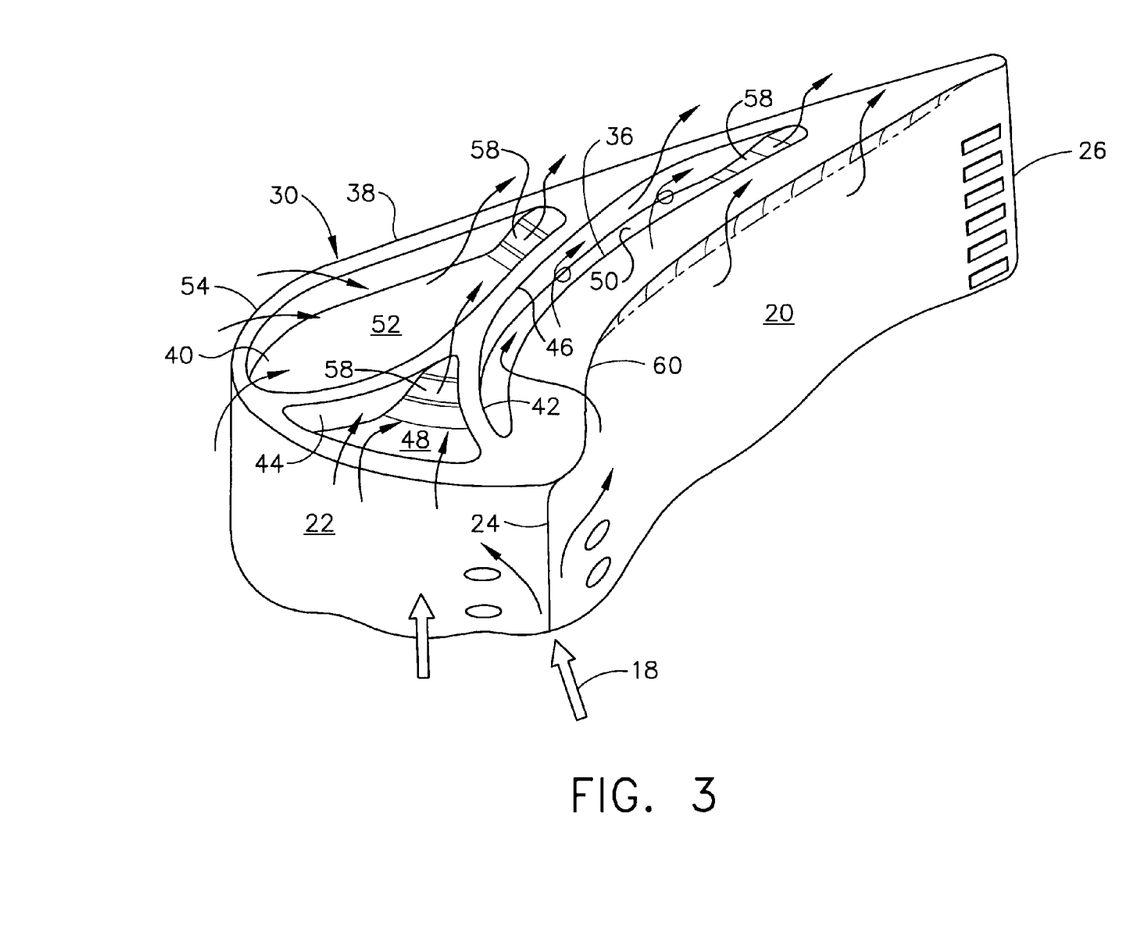
FIG. 3 is an enlarged isometric view of the airfoil tip illustrated in FIG. 1.

As shown in FIGS. 1-3 the airfoil also includes a tip floor 40 which bridges the opposite sides 20,22 to enclose the internal cooling circuit 32. The tip floor 40 is typically solid, but may have small cooling holes or dust holes (not shown) for discharging some of the spent air from the internal cooling circuit in any conventional manner.

The two ribs 36,38 extend radially outwardly from the common tip floor 40 as continuations or extensions of the corresponding sidewalls of the airfoil which define the opposite pressure and suction side surfaces thereof. The two ribs 36,38 are integrally joined together at the opposite leading and trailing edges 24,26 of the airfoil and provide a full perimeter extension of the aerodynamic pressure and suction sides of the airfoil.

Between the leading and trailing edges, the two ribs 36,38 are spaced transversely or circumferentially apart to include a trifurcate or three-fork tip baffle or rib defining a triforial or three-opening tip cavity exposed above the tip floor 40. The trifurcate baffle includes three baffle legs 42,44,46 which extend axially or chordally between the leading and trailing edges, and the triforial tip cavity includes three corresponding tip cavities or pockets 48,50,52 defined by the three legs and two squealer ribs.

The tip baffle is specially configured in counter profile or contour with the convex second rib 38 to divide the entire airfoil tip into three cavity sections so that the three corresponding pockets 48,50,52 laterally overlap or adjoin each other to improve sealing performance of the airfoil tip.

The airfoil 12 is illustrated in radial cross section in FIG. 2 with the typical crescent profile and increases in transverse width W aft from the leading edge 24 to a maximum width at a hump 54 in the convex suction side 22. From the hump, the airfoil then converges aft to the trailing edge 26 as required for maximizing aerodynamic performance due to the varying velocity and pressure distributions in the different regions along the two ribs 36,38 from leading to trailing edges 24,26.

The pressure side 20 of the airfoil is most concave along its forward portion and aerodynamically complements the airfoil suction side 22 which is most convex around its forward portion including the hump region. From the hump aft, the airfoil converges to the common trailing edge, with the aft portion of the pressure and suction sides having less curvature and approaching substantially straight chordal profiles near the thin trailing edge.

The triple leg tip baffle is used to divide the tip cavity into three distinct openings between the surrounding squealer ribs 36,38 which openings cooperate differently with the different regions around the pressure and suction sides of the ribs. In particular, the three legs 42,44,46 radiate laterally outwardly from a common integral junction of the corresponding, centrally-located ends of the legs.

The common junction is located in the maximum width region of the airfoil tip spaced generally in the middle between the two ribs 36,38. And, the three legs have corresponding opposite ends integrally joined to suitable locations of the two ribs 36,38.

In this way, the triple legs define the triple tip pockets. And, the triple pockets 48,50,52 correspondingly radiate or extend laterally outwardly from the common junction both transversely between the first and second ribs 36,38, and chordally between the leading and trailing edges 24,26.

Figure 4:
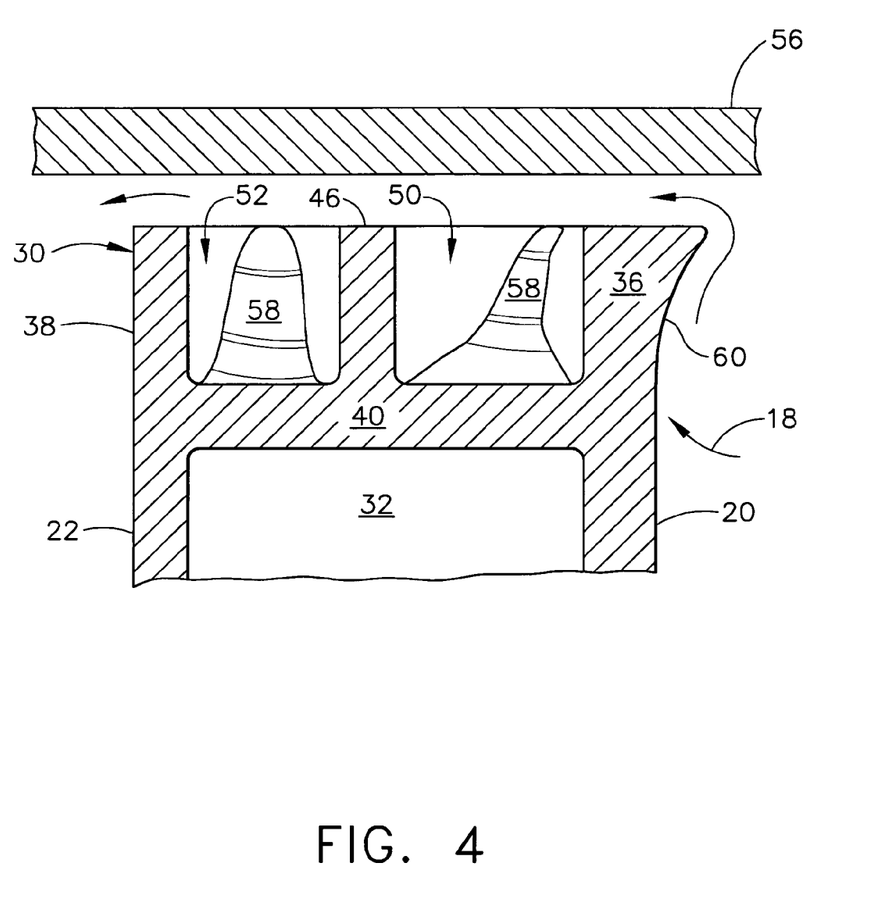
FIG. 4 is a transverse, radial sectional view through the airfoil tip illustrated in FIG. 1 and taken along line 4-4.

As shown in radial section in FIG. 4, the airfoil tip 30 is suitably mounted inside a conventional turbine shroud 56, shown in relevant part, to provide a relatively small radial clearance or gap therebetween. The combustion gases 18 leak over the pressure side 20 of the airfoil during operation, through the radial clearance, and are discharged over the lower pressure suction side 22 of the airfoil.

Each of the baffle legs has a rectangular transverse cross section and extends perpendicularly from the tip floor. The first and second ribs 36,38 and the tip baffle extend in common height or span from the tip floor 40 to provide a substantially constant radial gap with the inner surface of the surrounding turbine shroud 56. The radially outer surfaces of the airfoil tip illustrated in FIGS. 1, 3, and 4 are therefore coplanar with each other for providing a close, sealing fit with the surrounding shroud.

FIG. 3 illustrates a preferred configuration of the trifurcate tip baffle, and its division of the airfoil tip along its pressure and suction sides. The first two forward legs 42,44 define the head or Y-portion of the tip baffle and commence near the airfoil leading edge. The aft third leg 46 defines the base or stem of the tip baffle and terminates near the trailing edge.

More specifically, the distal end of the first leg 42 joins the two ribs 36,38 near their common junction at the leading edge 24.

The second leg 44 commences along the suction side of the airfoil chordally between the leading edge 24 and the hump 54, with a suitable intermediate spacing therebetween. The distal end of the second leg 44 preferably joins the second rib 38 near the hump 54 to define the first pocket 48 with the first leg 42, and the first pocket converges aft from the second rib 38.

The third leg 46 preferably terminates along the suction side chordally after the hump 54 and before the trailing edge 26 at a suitable intermediate spacing therebetween. The distal end of the third leg 46 integrally joins the second rib 38 to define on opposite sides thereof the second tip pocket 50 with the first rib 36, and the third tip pocket 52 with the second rib 38. The second pocket 50 converges aft to its aft end, and the third pocket 52 converges aft to its aft end.

Since the third leg 46 terminates integrally with the second rib 38 generally in the middle between the hump 54 and trailing edge 26, the second pocket 50 continues aft from that termination junction, and aft from the third pocket 52 which terminates at that junction.

The first pocket 48 is laterally bounded by the first and second legs 42,44 converging together from the second rib 38 to join the third leg 46. The second pocket 50 is laterally bounded by the first rib 36 and the coextensive first and third legs 42,46. And, the third pocket 52 is laterally bounded by the second rib 38 and the coextensive second and third legs 44,46.

Since the airfoil 12 has the concave pressure side 20 and the opposite convex suction side 22, the coextensive first and third legs 42,46 are collectively concave toward the second pocket 50 and the pressure side 20, and face the concave first rib 36 in similar concave chordal profile therewith. However, the coextensive second and third legs 44,46 face the convex second rib 38 in opposite or counter concave chordal profile therewith.

The common third leg 46 joins both the first and second legs 42,44 in the split Y-configuration, and is concave toward the second pocket 50 and faces the convex inboard side of the first rib 36, and is also convex toward the opposite third pocket 52 and faces the second rib 38 at which its arcuate profile is significantly less than at the hump region.

Due to the trifurcate, split configuration of the tip baffle, the concave outboard surfaces of the two legs 42,46 face the convex inboard surface of the first rib 36 in bounding the second pocket 50. And, the concave outboard surfaces of the two legs 44,46 face the concave inboard surface of the second rib 38 in bounding the third pocket 52.

Since the first pocket 48 is directly located near the leading edge 24, the inside surfaces of the two split legs 42,44 face inboard toward each other, and are convex; and cooperate with the concave inboard surface of the second rib 38 to bound this forward pocket 48 in a symmetrical Y-fork configuration. And, the split forward legs 42,44 guide the incident combustion gas flow in a converging flow channel towards the common junction of the three legs.

As shown in FIG. 3, at least one, and preferably all three, of the tip pockets 48,50,52 includes a ramp 58 inclined aft and outwardly from the tip floor 40. The first pocket 48 includes a first ramp 58 between the first and second legs 42,44 terminating at the junction with the third leg 46.

The second pocket 50 includes a second ramp 58 between the first and second ribs 36,38 which terminates near the junction with the trailing edge 26. And, the third pocket 52 includes a third ramp 58 between the third leg 46 and the second rib 38 which terminates at the junction with the second rib 38.

FIG. 4 shows two of the three ramps 58 which are correspondingly located at the aft end of each tip pocket, and provide an aerodynamically smooth transition from the common tip floor 40 to the radially outer end of the airfoil tip.

Each ramp 58 may have a straight or curved configuration as the specific flow fields require for maximizing performance. Preferably, the ramps join the tip floor at concave blends therewith, and join the airfoil tip at convex blends. And in between, the ramps may be straight or have an inflection region between the opposite concave and convex portions thereof.

As indicated above in the Background section, the 3D configuration of the turbine blade is highly complex and the turbine airfoil is operated in the highly complex 3D flow field of the combustion gases 18 which are split around the airfoil leading edge during operation.

FIG. 3 illustrates exemplary streamlines of the split gas flow around the aerodynamic profile of the airfoil tip. CFD analysis has been performed on the exemplary embodiment illustrated in FIG. 3 to confirm performance improvements therefrom compared with a reference design having a single tip cavity without the trifurcate tip baffle therein.

The introduction of the tip baffle disclosed above may be used in specific designs for improving turbine efficiency as well as reducing leakage of the combustion gases over the airfoil tip through the tip-shroud clearance.

Turbine efficiency is based on the ability of the airfoil surfaces to extract energy from the differential pressure in the combustion gases acting over the pressure and suction sides of the airfoil from root to tip and between the leading and trailing edges. The introduction of the tip baffle provides additional surface area at the blade tip against which the tip flow may perform additional work on the blade. The tip baffle also provides an additional seal like the two squealer tip ribs 36,38 themselves for reducing tip flow leakage.

Tip leakage includes both axial and circumferential components in view of the 3D configuration of the airfoil tip illustrated in FIG. 3 for example. The combustion gases 18 engage the airfoil around its leading edge 24 both in axial and circumferential directions due to the skewed inlet angle from the upstream turbine nozzle (not shown).

The first tip pocket 48 captures incident flow streamlines over the forward portion of the second rib 38 and funnels the trapped gases aft between the two legs 42,44. The funneled gases effect secondary flow fields that pressurize the first pocket and provide an aerodynamic flow barrier along the first leg 42.

Similarly, the third tip pocket 52 captures incident flow along its forward portion before the hump, and funnels the trapped leakage flow aft to pressurize the third tip pocket 52 and provide a continuing aerodynamic flow barrier along the third leg 46.

The so pressurized first and third pockets 48,52 discourage flow leakage thereover from the airfoil pressure side, and increase turbine efficiency by extracting additional energy from the tip baffle itself.

Correspondingly, the combustion gases also leak over the first rib 38 into the second tip pocket 50 and are funneled in the aft direction therein. The leakage gases from the aft ends of both pockets 50,52 will then be discharged over the aft portion of the suction side second rib 38 in the downstream direction.

By converging the three pockets 48,50,52 in their aft direction, the secondary flow therein will accelerate and further pressurize the airfoil tip. The three ramps 58 may be introduced at the aft ends of the three pockets 48,50,52 to further accelerate the secondary flow and further pressurize the airfoil tip.

Accordingly, the specifically configured and located tip baffle provides a simple mechanism to reduce both axial and circumferential leakage of the combustion gases as they flow over the airfoil tip during operation, while correspondingly improving turbine efficiency.

Furthermore, the introduction of the tip baffle biases the tip leakage more aft along the chord of the airfoil where the airfoil tapers to the trailing edge which reduces the loss in efficiency due to that very leakage itself.

In the preferred embodiment illustrated in FIGS. 3 and 4, the third leg 46 is positioned near the transverse middle between the opposite sides of the airfoil for maximizing the local widths of the two pockets 50,52. If the pocket width is too small, the leakage gases may simply overflow the second pocket 50 without generating significant local flow fields therein and thereby limiting performance improvement from the baffle.

For this reason, the baffle preferably includes only three legs and terminates suitably upstream from the thin trailing edge of the airfoil illustrated in FIG. 3 to provide only three tip pockets and maintain a suitable minimum width of the two aft pockets 50,52 for maximizing the performance advantages of the triforial tip.

In the exemplary embodiment of the turbine blade illustrated in FIGS. 1-4, both the second squealer rib 38 and baffle legs 42,44,46 have similar rectangular transverse sections extending radially outwardly from the common tip floor 40, and may be about 20-25 mils (0.5-0.6 mm) wide. The first squealer rib 36, however, may include an arcuate flare 60 along the pressure side 20 of the airfoil for further discouraging flow leakage in another improvement for turbine blades.

The height of the ribs and pockets may be about 40 mils (1.0 mm). And, the minimum width of the two pockets 50,52 which transversely bridge the pressure and suction sides may be about 30 mils (0.76 mm).

The introduction of the relatively simple trifurcate tip baffle in the turbine blade disclosed above requires little change to the blade itself, with a corresponding minor increase in weight thereof. However, the simple tip baffle may be used to significantly improve turbine efficiency in a full row of the turbine blades, while also significantly reducing gas flow leakage over the airfoil tip.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine blade comprising:
   an airfoil, platform, and integral dovetail;
   said airfoil having opposite pressure and suction sides extending in chord between opposite leading and trailing edges and extending in span from root to tip;
   said tip including first and second ribs extending from a tip floor along said pressure and suction sides, respectively; and
   said first and second ribs are joined together at said leading and trailing edges and are spaced transversely apart to include a trifurcate tip baffle extending chordally in counter profile with said second rib to define triple tip pockets adjoining each other.

2. A blade according to claim 1 wherein said tip baffle comprises first, second, and third legs radiating outwardly from a common junction to define first, second, and third tip pockets radiating laterally outwardly from said common junction both transversely between said first and second ribs and chordally between said leading and trailing edges.

3. A blade according to claim 2 wherein:
   said airfoil increases in width aft from said leading edge to a maximum width at a hump in said suction side, and then converges to said trailing edge;
   said first leg joins one of said ribs near said leading edge;
   said second leg joins said second rib after said leading edge and before said hump to define said first pocket with said first leg; and
   said third leg joins said second rib after said hump and before said trailing edge to define on opposite sides thereof said second pocket with said first rib, and said third pocket with said second rib.

4. A blade according to claim 3 wherein:
said first pocket is bounded by said first and second legs converging together from said second rib to join said third leg;
said second pocket is bounded by said first rib and said first and third legs; and
said third pocket is bounded by said second rib and said second and third legs.

5. A blade according to claim 4 wherein said first leg is concave toward said second pocket and faces a convex inboard side of said first rib, and said second leg is concave toward said third pocket and faces a concave inboard side of said second rib.

6. A blade according to claim 5 wherein said third leg is concave toward said second pocket and faces said convex inboard side of said first rib, and said third leg is convex toward said third pocket and faces said second rib.

7. A blade according to claim 6 wherein:
said first and second ribs and tip baffle extend in common height from said tip floor; and
said first rib includes an arcuate flare along said airfoil pressure side.

8. A blade according to claim 6 wherein said first leg commences at said leading edge at the junction of said first and second ribs.

9. A blade according to claim 6 wherein:
said second pocket converges aft to its aft end, and said third pocket converges aft to its aft end; and
said third leg terminates integrally with said second rib, and said second pocket continues aft therefrom, and aft from said third pocket.

10. A blade according to claim 6 wherein:
said first pocket includes a ramp between said first and second legs terminating at said third leg;
said second pocket includes a ramp between said first and second ribs terminating near said trailing edge; and
said third pocket includes a ramp between said third leg and second rib terminating at said second rib.

11. A turbine blade comprising an airfoil tip having a pressure-side first rib joined to a suction-side second rib at opposite leading and trailing edges and spaced transversely apart to include a trifurcate tip baffle extending chordally between said leading and trailing edges to define triple tip pockets.

12. A blade according to claim 11 wherein said tip baffle comprises first, second, and third legs integrally joined together at corresponding central ends between said ribs, and having opposite ends integrally joined to said ribs.

13. A blade according to claim 12 wherein:
said first leg joins one of said ribs near said leading edge;
said second leg joins said second rib after said leading edge to define a first tip pocket with said first leg; and
said third leg joins said second rib before said trailing edge to define on opposite sides thereof a second tip pocket with said first rib, and a third tip pocket with said second rib.

14. A blade according to claim 13 wherein:
said first pocket is bounded by said first and second legs converging together from said second rib to join said third leg;
said second pocket is bounded by said first rib and said first and third legs; and
said third pocket is bounded by said second rib and said second and third legs.

15. A blade according to claim 14 further comprising an airfoil having a concave pressure side and an opposite convex suction side, and said first and third legs face said first rib in similar profile therewith, and said second and third legs face said second rib in opposite profile therewith.

16. A blade according to claim 15 wherein said first leg is concave toward said second pocket and faces a convex inboard side of said first rib, and said second leg is concave toward said third pocket and faces a concave inboard side of said second rib.

17. A blade according to claim 16 wherein said third leg is concave toward said second pocket and faces said convex inboard side of said first rib, and said third leg is convex toward said third pocket and faces said second rib.

18. A blade according to claim 15 wherein said airfoil increases in width aft from said leading edge to a maximum width at a hump in said suction side, and then converges to said trailing edge, said second leg commences between said leading edge and hump, and said third leg terminates between said hump and trailing edge.

19. A blade according to claim 18 wherein said first leg commences at said leading edge at the junction of said first and second ribs.

20. A blade according to claim 18 wherein said second leg commences integrally with said second rib near said hump.

21. A blade according to claim 18 wherein said second pocket converges aft to its aft end, and said third pocket converges aft to its aft end.

22. A blade according to claim 18 wherein said third leg terminates integrally with said second rib, and said second pocket continues aft therefrom, and aft from said third pocket.

23. A blade according to claim 18 wherein said airfoil further includes a tip floor from which said first and second ribs and tip baffle extend in common height.

24. A blade according to claim 23 wherein at least one of said tip pockets includes a ramp inclined aft from said tip floor.

25. A turbine blade comprising an airfoil having a trifurcate tip baffle defining a triforial tip cavity bounded by opposite tip ribs.

26. A blade according to claim 24 wherein all three of said tip pockets include corresponding ones of said ramps.

27. A blade according to claim 24 wherein:
said first pocket includes a ramp between said first and second legs terminating at said third leg;
said second pocket includes a ramp between said first and second ribs terminating near said trailing edge; and
said third pocket includes a ramp between said third leg and second rib terminating at said second rib.

28. A blade according to claim 18 wherein said first rib includes an arcuate flare along said airfoil pressure side.

* * * * *